(12) United States Patent
Hamlin

(10) Patent No.: US 9,836,611 B1
(45) Date of Patent: *Dec. 5, 2017

(54) VERIFYING THE INTEGRITY OF A COMPUTING PLATFORM

(71) Applicant: Christopher Luis Hamlin, San Jose, CA (US)

(72) Inventor: Christopher Luis Hamlin, San Jose, CA (US)

(73) Assignee: Christopher Luis Hamlin, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,852

(22) Filed: Nov. 21, 2016

Related U.S. Application Data

(63) Continuation of application No. 15/087,822, filed on Mar. 31, 2016, now Pat. No. 9,530,002.

(60) Provisional application No. 62/283,240, filed on Aug. 26, 2015.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,782,434 B1 | 7/2014 | Ghose | |
| 8,782,435 B1 * | 7/2014 | Ghose | G06F 9/3851 711/118 |
| 9,246,690 B1 * | 1/2016 | Roth | H04L 9/3268 |
| 9,530,002 B1 * | 12/2016 | Hamlin | G06F 21/57 |
| 2005/0278499 A1 * | 12/2005 | Durham | G06F 12/1433 711/173 |
| 2012/0204182 A1 * | 8/2012 | Doteguchi | G06F 11/3664 718/102 |

* cited by examiner

*Primary Examiner* — Kaveh Abrishamkar
(74) *Attorney, Agent, or Firm* — Park, Vaughan, Fleming & Dowler LLP; Laxman Sahasrabuddhe

(57) ABSTRACT

Systems and techniques are described for verifying the integrity of a computing platform. Specifically, a software image can be generated that, when executed at a computing platform, verifies integrity of the computing platform. Next, the software image can be sent to the computing platform. The computing platform can execute the software image, thereby enabling the verification of the integrity of the computing platform.

18 Claims, 5 Drawing Sheets

VERIFYING THE INTEGRITY OF A COMPUTING PLATFORM

RELATED APPLICATION

This patent application is a continuation of, and hereby claims priority under 35 U.S.C §120 to, pending U.S. patent application Ser. No. 15/087,822, entitled "Verifying the Integrity of a Computing Platform," by inventor Christopher Luis Hamlin, filed on 31 Mar. 2016, the contents of which are herein incorporated by reference in their entirety for all purposes. U.S. patent application Ser. No. 15/087,822 claims benefit of U.S. Provisional Application Ser. No. 62/283,240, filed on 26 Aug. 2015, by the same inventor, the contents of which are herein incorporated by reference in their entirety for all purposes.

BACKGROUND

Technical Field

This disclosure relates to computer security. More specifically, this disclosure relates to verifying the integrity of a computing platform.

Related Art

Consider a computer code which conforms in every respect to the design intentions motivating its development; call such a code uncontaminated. One path adopted by adversaries wishing to modify or interfere with the intended operation of the uncontaminated code is to introduce surreptitiously either alternative or additional computer instructions into the execution space of the code which subvert or alter the function or outcome of the code's execution. It is therefore desirable to provide means by which the integrity or intactness of the uncontaminated code may be verified so as to provide assurance that its operation and results conform to the outcomes intended by its design.

One common method employed to achieve this is to measure the code against a known valid criterion; an example would be the well-known use of Trusted Platform Module (TPM) hardware for code measurement. One of the main uses of TPM is to assure the integrity of a platform. Specifically, the Basic Input/Output System (BIOS) and the operating system (OS) of a computing platform use TPM to assure the integrity of the computing platform.

TPM based solutions for verifying the integrity of a computing platform have at least two serious drawbacks. First, these solutions require the presence of TPM (or equivalent) hardware in the computing platform. Second, these solutions require a correct implementation of the TPM-based security architecture within the computing platform. Unfortunately, this means that billions of existing systems are excluded from the ability to measure securely the integrity of their computer codes, because, lacking correctly implemented, or any, hardware security features, they are subject to penetration by a malicious adversarial software entity such as a malicious hypervisor.

SUMMARY

Some embodiments provide techniques and systems to verify the integrity of a target computing platform. Specifically, some embodiments can generate a software image that, when executed at a target computing platform, verifies integrity of the target computing platform based on comparing (1) execution parameters measured during an execution of a portion of the software image at the target computing platform with (2) execution parameters associated with executing the portion of the software image at a secure computing platform. An execution parameter associated with executing the portion of the software image can generally include any parameter associated with code execution. Specifically, if a parameter changes during code execution, then that parameter is a potential execution parameter that can be used for verification purposes. Examples of execution parameters include, but are not limited to, total cycles, absolute starting time, absolute ending time (as reported via, for example, secure NTP), GPS parameters, the number of instructions that were executed (i.e., an instruction count), etc. Next, the embodiments can send the software image to the target computing platform. The embodiments can then receive a verification message from the target computing platform, wherein the verification message was generated by the software image while the software image was executing at the target computing platform. Next, the embodiments can verify the integrity of the target computing platform based on the verification message.

In some embodiments, generating the software image can comprise: determining a first set of execution parameter values that corresponds to executing the software code on a secure instance of the target computing platform; determining a first encrypted data structure by encrypting a first data structure comprising the first set of execution parameter values; determining a second set of execution parameter values that corresponds to decrypting the first encrypted data structure on the secure instance of the target computing platform; determining a second encrypted data structure by encrypting a second data structure comprising the second set of execution parameter values; and generating the software image comprising the first encrypted data structure, the second encrypted data structure, and instructions that, when executed at the target computing platform, cause the target computing platform to (1) decrypt the first encrypted data structure, (2) measure a third set of execution parameter values that corresponds to decrypting the first encrypted data structure on the target computing platform, (3) decrypt the second encrypted data structure to obtain the second set of execution parameter values, (4) compare the third set of execution parameter values with the second set of execution parameter values, and (5) generate the verification message based on a result of said comparison.

In some embodiments, the verification message includes an encrypted data structure comprising the third set of execution parameter values that corresponds to decrypting the first encrypted data structure on the target computing platform.

Some embodiments can take an appropriate action based on whether or not the integrity of the target computing platform was successfully verified. Specifically, in response to determining that the integrity of the target computing platform has been compromised, the embodiments can send an instruction to the software image on the target computing platform to reset the target computing platform to a secure state. On the other hand, in response to determining that the integrity of the target computing platform has not been compromised, the embodiments can send an instruction to the software image on the target computing platform to activate software code that was embedded in the software image. In this disclosure, the phrase "activate software code" generally refers to actions that are taken to ensure that the software code can start execution on a given computing platform, and optionally starting execution of the activated software code.

DETAILED DESCRIPTION

Figure 1:
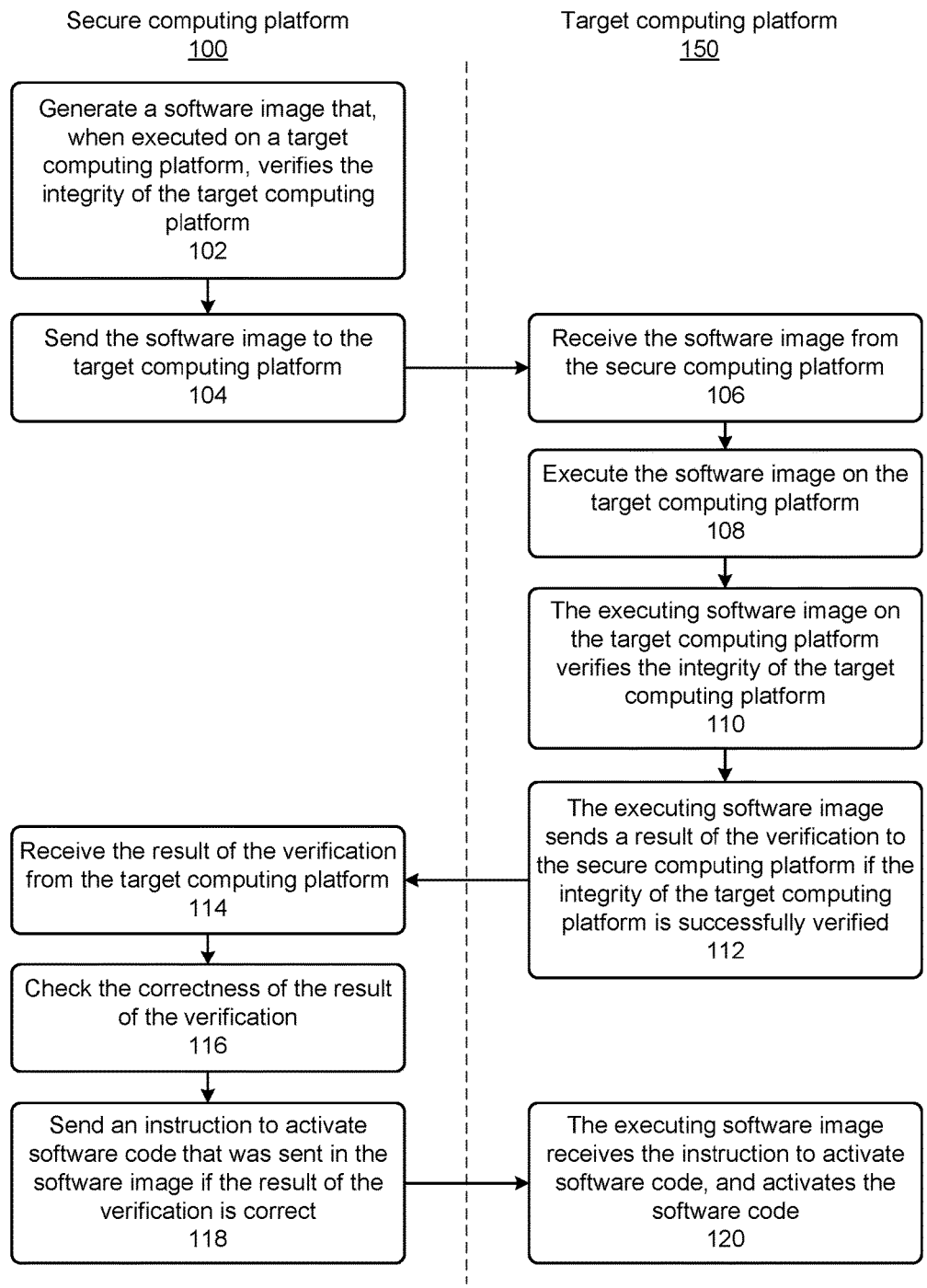
FIG. 1 illustrates a process for verifying the integrity of a computing platform in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

Overview

Some embodiments described herein provide methods and apparatuses for securing the correct operation of computer code and data in the face of adversarial attempts to corrupt, infiltrate, subvert, or disrupt the behavior of code and data from that intended by the legitimate deployment of such assets. Specifically, embodiments described herein provide secure execution of computer instructions and procedures within possibly insecure environments. These embodiments can protect against the most severe attacks launched by adversaries with state-level resources. As a proxy for the class of threats against which embodiments described herein must defend, a model of a malicious hypervisor is advanced by way of illustrating a near-worst-case scenario.

This disclosure uses certain terms when describing the embodiments for verifying the integrity of a computing platform. Some of these terms are now discussed. According to one definition, a computing platform, or a computing environment (or an environment for short) is any system or mechanism that is capable of performing computations. A computing platform always includes hardware but can also include software. For example, a computing platform can include an integrated circuit that is capable of executing instructions. The instructions and optionally data can be stored in a memory system that provides an addressable memory space to the integrated circuit. The memory system itself can comprise multiple hardware and software components, e.g., memory controllers, caches, memory chips, disk drives, memory management software code, etc. The computing platform can optionally include a software layer (e.g., a BIOS and/or an OS) that is stored in the memory system, and that provides a standardized computing interface for use by software applications. Examples of computing platforms include, but are not limited to, a smartphone, a handheld computer, a laptop computer, a desktop computer, a printer, an appliance, a virtual machine executing on a computer, etc.

According to one definition, a network is a set of one or more interconnected devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, subnets, etc.

Communication between two nodes of a network is typically accomplished using a layered software architecture, which is often referred to as a networking software stack or simply a networking stack. As is true of any data processing function, a given functionality in a networking stack can be implemented using hardware or software or a combination thereof. The decision to implement a specific functionality in hardware or software is typically based on a tradeoff between performance and cost.

A secure environment, or a secure instance of a computing platform can be defined as one that is essentially impossible for an adversary to penetrate or subvert. Examples would be a computer system in a military installation that is intended for strategic control operations, or a computer in a major financial institution's funds transfer data center. Another example, which is on a different scale than the two described above, might be a mobile device protected by TPM.

A computing platform or a computation performed by a computing platform can correspond to a state space. When a computing platform is initialized (e.g., turned on), the computing platform may correspond to an initial state in the state space. The state corresponding to the computing platform can change whenever any computing activity occurs, e.g., inputs are provided to the computing platform, computation is performed by the computing platform, or outputs are produced by the computing platform. Therefore, when a computing platform executes code, one can consider the computing platform to be moving through a sequence of states in the state space. In this state space view of the computing platform, an adversarial attack on the computing platform corresponds to a deviation from a normal sequence of states that the computing platform is expected to take in the state space. Some embodiments verify the integrity or intactness of a computing platform by determining whether or not the computing platform is moving through the normal or expected sequence of states.

There are thousands upon thousands of techniques for penetrating or subverting systems and computer codes. Embodiments described herein are intended to serve two purposes: (1) to verify that a particular computing platform or environment (a state space) is uncontaminated (i.e., has not been corrupted, modified, or subverted), and (2) to allow such a space to be restored to a known uncontaminated state upon command if found to have been subverted or maliciously altered.

Specifically, some embodiments described herein transport operational computer code (or a state space) from a secure environment to an environment which is not known to be secure and must therefore be assumed insecure, and to install it in the target environment so that it may begin operation in the knowledge that its integrity is intact. This means that the code installed in the target space perfectly reflects its condition as it existed within the secure environment from which it was extracted and transported. An example would be a secure data center from which a code image was copied, and then securely installed on a mobile computing device like a laptop computer or a smartphone. These embodiments ensure that the image as installed on the target environment has not been corrupted, notwithstanding that the target environment may very well be infected with malicious code of unknown characteristics. An attacker will attempt to attack a computing platform by introducing alien code and data into the address and state space of the uncontaminated code, or perhaps to delete portions of the original contents. Embodiments described herein render it difficult, if not impossible, for an attacker to accomplish such attacks without detection. The degree of adversarial effort defended against can be made an adjustable parameter in these embodiments.

Some embodiments can operate as follows. First, the uncontaminated code can be read one byte or instruction at a time in a secure computing platform or environment. The target computing platform or environment (i.e., the computing platform or environment where the uncontaminated code is to be installed) can be represented within the secure environment by an abstract model of its exact hardware, memory, timing, clock type (e.g., spread spectrum), computational, and input/output composition, among other features. This abstract model is called the target template. The exact number of clock cycles at the given operating frequency for each instruction can be calculated from a table included as part of the target template. The values and totals for each execution parameter can be computed: total cycles, absolute starting time, absolute ending time (as reported via, for example, secure NTP), possibly Global Positioning System (GPS) parameters, and computer instructions, among other values.

A data structure can be populated with the execution parameters, and the embodiments can then encrypt the data structure into which the execution parameters were populated. A number of encryption techniques, such as streaming, block, symmetric, asymmetric, etc., are known in the art. In general, the embodiments can use any encryption technique that is appropriate for a given use case. Next, the number of cycles and instructions required to encrypt and/or decrypt the data structure is itself encrypted and incorporated in the code structure, together with other relevant values and parameters. The final software image incorporating code, time, cycles, ciphertext, etc., can then be conveyed, possibly over insecure channels, to the target computing platform. When received at the target computing platform, the image can be executed by jumping to its first executable location (which has been programmed before transmission to the target computing platform) at the predetermined time encoded in the image when it was prepared in the secure computing platform. The decryption process (which is performed by the software image that was sent to the target computing platform) unpacks the executable codes, and records the cycles, code integrity, and timing associated with the decryption process.

If and only if the cycles and timing associated with the decryption process conform to the requirements (which were computed and retained in the secure environment) of the target system's computing platform, the result of the unpacking is transmitted in encrypted form back to the secure environment in order to verify that an uncontaminated instantiation has successfully been transported to the target computing system. The secure computing platform can then check the time, and verify that the values of the associated parameters (cycle count, absolute time, check sums, GPS, and so on) conform to the requirements established when the image was initially constructed in the secure environment. If this criterion is met, the secure environment can signal through a suitable secure message, which is pertinent only to the software image on the target computing system, that the contents of the address space of the target computing platform into which the software image was installed is now suitable for execution, and the code (which is included in the software image) may be made active.

Here's why these embodiments can verify the integrity of the target computing platform: if an adversary attempts to interfere with the installation of the code on the target environment, the attempt will necessarily disrupt the deterministic relationship between the content of the code, the cycle count, the instruction count, the absolute time, and the encryption of these; these values are uniquely interdependent (are self-referential) such that none may be altered without inducing a detectable change in the others. If any attempt at alteration has taken place, it will be reported to, and/or detected by, the secure environment, whereupon any of several types of response may be mobilized depending upon requirements and conditions: repair, invalidation, forensic analysis, audit trail preparation, and so on.

As explained above, some embodiments enable a secure environment to introduce uncontaminated code into the target environment, where it may serve as an application, communicate with other applications, verify the integrity of the environment, and/or report back. It might be thought that unmodifiable firmware, perhaps with checksums, in the target could confer the same properties as the embodiments described in this disclosure. This is not so, however, because of the requirement that the protection be effective against malicious intervention with the capability of modifying code in the execution pathway; the malicious hypervisor alluded to above, examples of which are known in current cybersecurity literature, is an example of such a threat.

Only by means of the self-referential mechanism described in this disclosure can such malicious attacks be detected and prevented. Note that the secure environment may be any system deemed secure within the terms of the intended application: it might even be a mobile device protected by a properly implemented TPM. Also note that the security properties of the software image that is sent to the target environment may be ascribed to an otherwise insecure target environment, so long as the software image is validated as to its integrity using the mechanisms described in this disclosure, on an as-needed basis. Thus networks and meshes with security properties which are verifiable on demand may be constructed from devices and images stemming from an originating secure environment.

Some embodiments described herein provide methods and apparatuses for building the software image within the secure environment, as well as the design and implementation of the target template which dictates the parameter values employed in constructing the image. In summary, values of any of several parameters relating to time, frequency, cycle counts, addresses, authentication, and functions, may be incorporated within the software image, including the values of the parameters associated with the actual encryption or decryption operations themselves. The reason for including these parameter values is to render impractical interference with or modification of the decryption and decoding process applied to the image when it has been installed on a target: the act of discovering a valid intervention or modification would in itself entail altering the timing and instruction definitions which are encoded within the image. The report back to the secure environment would therefore instantly be recognized as counterfeit when it is compared to the template prepared at the time the image was initially generated in the secure environment prior to shipping it to the target environment.

Notice that this process of including parameter values in the software image (as described above) may be applied recursively (that is, shells within shells may harbor distinct encryption and temporal code signatures which may be independent of one another or dependent upon one another in ways stemming from the characteristics of the specific application or use case). In either event the adversary is confronted with the near impossibility of interacting with the decoding process, or of altering the content and its state space, without betraying the fact of attempted interference.

Furthermore, embodiments described herein may be employed to create validation and authentication services originating from and controlled by the secure environment(s) which may scrutinize the operation and integrity of target environments at any time, on either a random or a scheduled basis. Random testing of target environments provides a powerful tool for inhibiting and removing malicious threats. Moreover, the frequency and intensity of probes and tests may be modulated from the secure environment(s) in adaptive response to the severity and risk exposure represented by detected intrusions. Some embodiments for verifying the integrity of a computing platform are now described.

Verifying the Integrity of a Computing Platform

FIG. 1 illustrates a process for verifying the integrity of a computing platform in accordance with some embodiments described herein. Secure computing platform 100 and target computing platform 150 can communicate over a network. The process can begin by generating a software image that, when executed on a target computing platform, verifies the integrity of the target computing platform (operation 102). Next, secure computing platform 100 can send the software image to target computing platform 150 (operation 104), and target computing platform 150 can receive the software image (operation 106). Next, the software image can be executed at the target computing platform 150 (operation 108). The executing software image on the target computing platform can then verify the integrity of the target computing platform (operation 110). Next, the executing software image can send a result of the verification to the secure computing platform if the integrity of the target computing platform is successfully verified (operation 112), and the result of the verification can be received by the secure computing platform 100 (operation 114). The correctness of the result of the verification can then be checked (operation 116), and an instruction to activate software code that was sent in the software image can be sent if the result of the verification is correct (operation 118). Next, the executing software image on the target computing platform 150 can receive the instruction to activate software code, and activate the software code (operation 120).

Figure 2A:
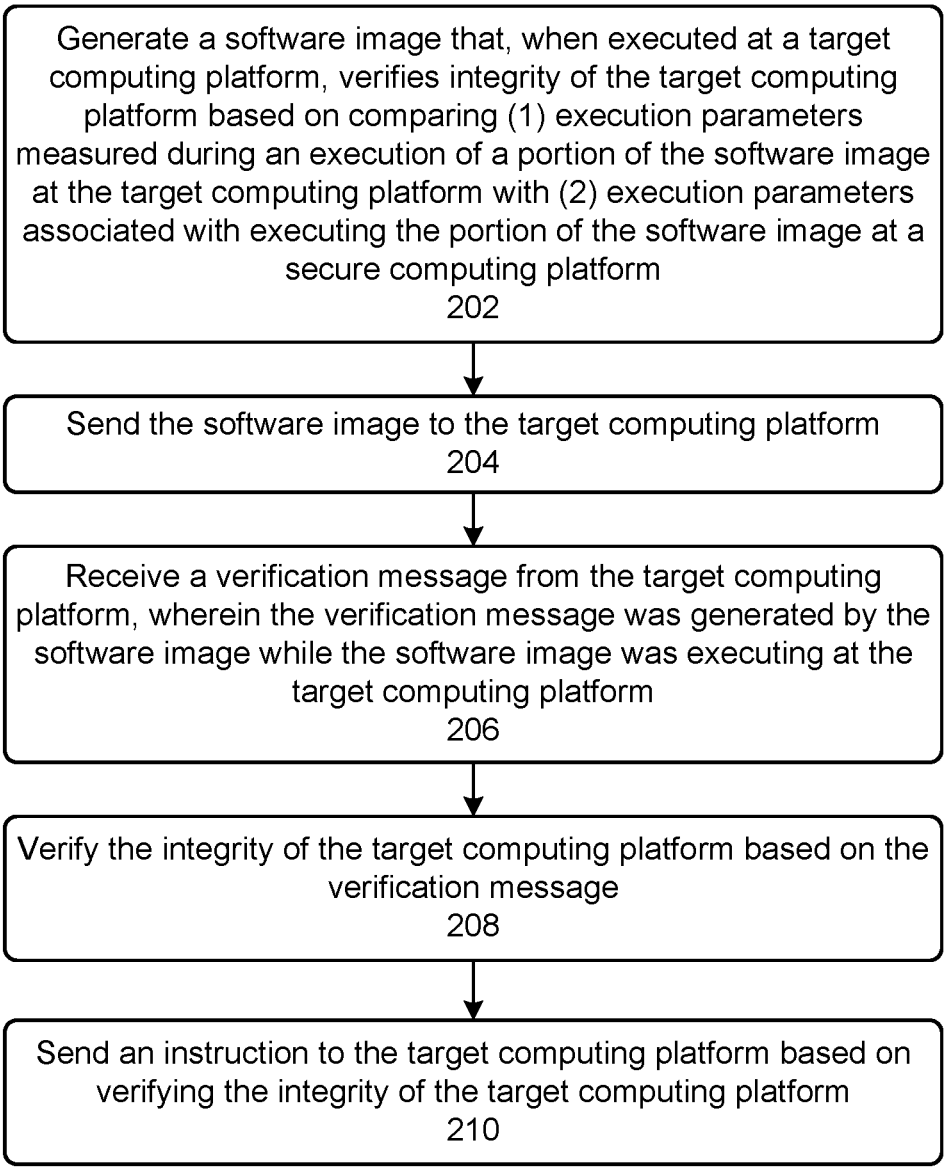
FIG. 2A illustrates a verification process that can be performed at a secure computing platform in accordance with some embodiments described herein.

FIG. 2A illustrates a verification process that can be performed at a secure computing platform in accordance with some embodiments described herein. The process can begin by generating a software image that, when executed at a target computing platform, verifies integrity of the target computing platform based on comparing (1) execution parameters measured during an execution of a portion of the software image at the target computing platform with (2) execution parameters associated with executing the portion of the software image at a secure computing platform (operation 202). The software image can then be sent to the target computing platform (operation 204). Next, a verification message can be received from the software image which is at the target computing platform (operation 206). The integrity of the target computing platform can then be verified based on the verification message (operation 208). Next, the process can send an instruction to the target computing platform based on verifying the integrity of the target computing platform (operation 210).

Figure 2B:
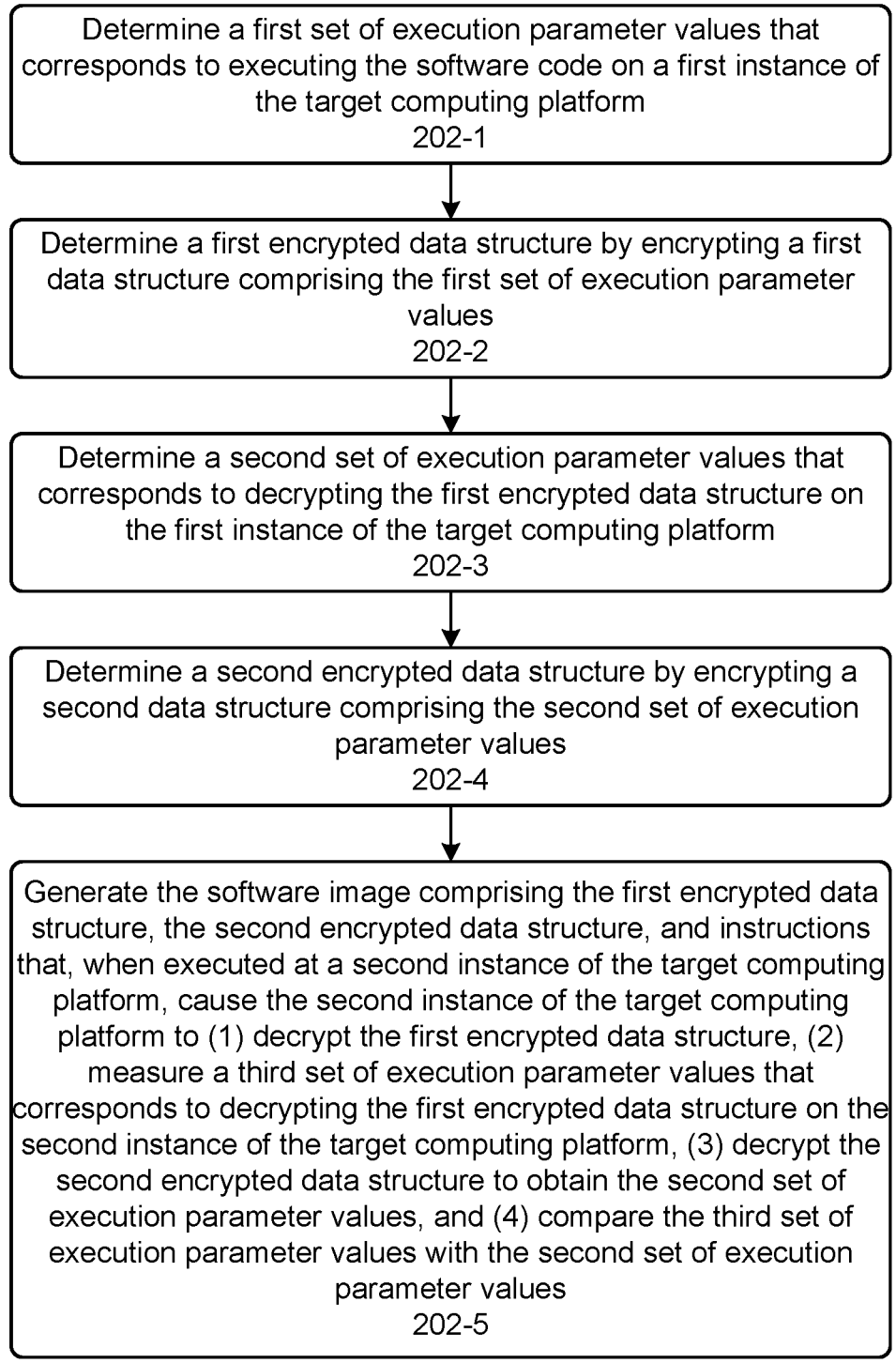
FIG. 2B illustrates a process for generating a software image in accordance with some embodiments described herein.

FIG. 2B illustrates a process for generating a software image in accordance with some embodiments described herein. The process can begin by determining a first set of execution parameter values that corresponds to executing the software code on a first instance of the target computing platform (operation 202-1). Next, a first encrypted data structure can be determined by encrypting a first data structure comprising the first set of execution parameter values (operation 202-2). A second set of execution parameter values can then be determined that corresponds to decrypting the first encrypted data structure on the first instance of the target computing platform (operation 202-3). Next, a second encrypted data structure can be determined by encrypting a second data structure comprising the second set of execution parameter values (operation 202-4). Finally, the process can generate the software image comprising the first encrypted data structure, the second encrypted data structure, and instructions that, when executed at a second instance of the target computing platform, cause the second instance of the target computing platform to (1) decrypt the first encrypted data structure, (2) measure a third set of execution parameter values that corresponds to decrypting the first encrypted data structure on the second instance of the target computing platform, (3) decrypt the second encrypted data structure to obtain the second set of execution parameter values, and (4) compare the third set of execution parameter values with the second set of execution parameter values (operation 202-5).

The specific software image that is created for a given target platform can depend on multiple factors. In particular, the set of execution parameter values that are used for verifying the target computing platform can depend on the threat level that is expected at the target computing platform. For example, if a low threat level is expected, then a single execution parameter value can be used. For example, at one or more points during code execution, a timestamp can be stored (which can be the system time or a time obtained via secure NTP). The sequence of timestamps can then be used for verification purposes. On the other hand, if a high threat level is expected, then a larger number of interdependent execution parameter values can be used. Additionally, depending on the capabilities of the target computing platform and/or depending on the capabilities of the adversary, different sets of execution parameter values can be used.

Figure 2C:
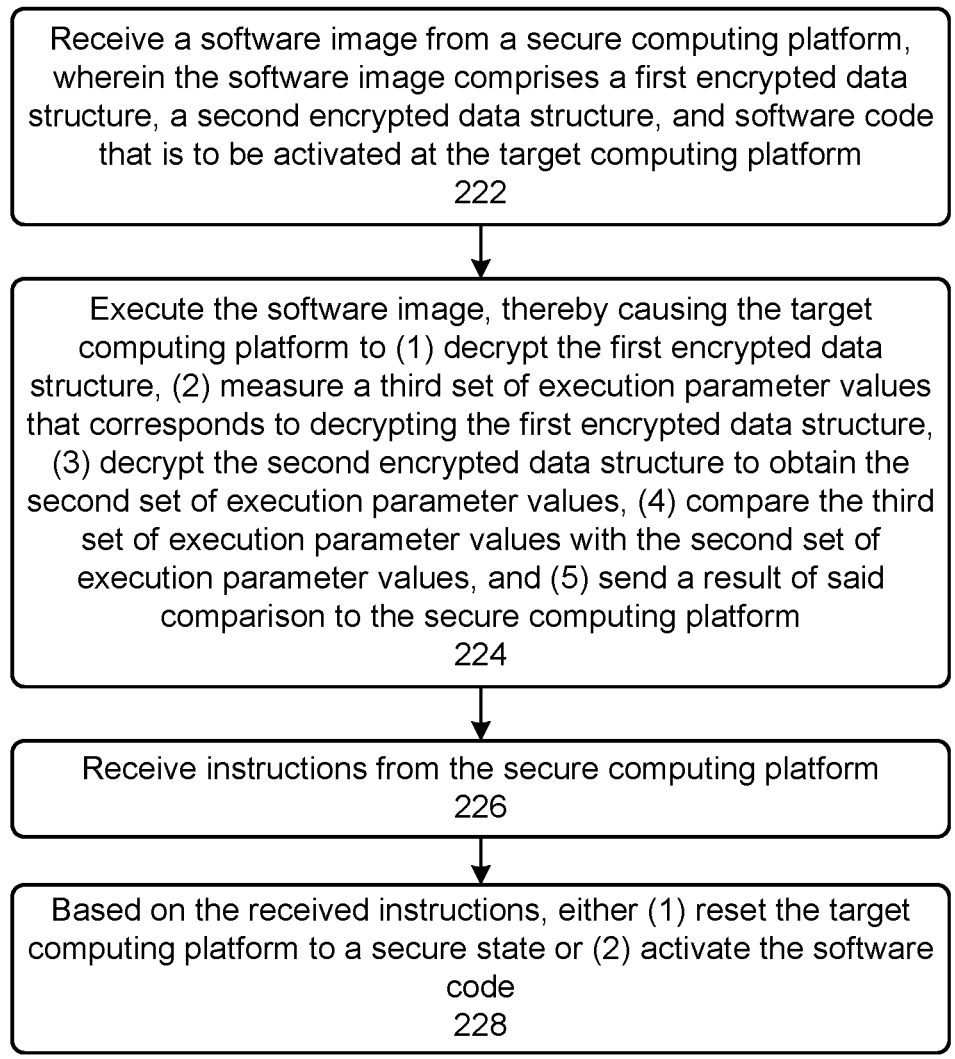
FIG. 2C illustrates a verification process that can be performed at a target computing platform in accordance with some embodiments described herein.

FIG. 2C illustrates a verification process that can be performed at a target computing platform in accordance with some embodiments described herein. The process can begin by receiving a software image from a secure computing platform, wherein the software image comprises a first encrypted data structure, a second encrypted data structure, and software code that is to be activated at the target computing platform (operation 222). Next, the target computing platform can execute the software image, thereby causing the target computing platform to (1) decrypt the first encrypted data structure, (2) measure a third set of execution parameter values that corresponds to decrypting the first encrypted data structure, (3) decrypt the second encrypted data structure to obtain the second set of execution parameter values, (4) compare the third set of execution parameter values with the second set of execution parameter values, and (5) send a result of said comparison to the secure computing platform (operation 224). The target computing platform can then receive instructions from the secure computing platform (operation 226). Based on the received instructions, the target computing platform can either (1) reset the target computing platform to a secure state or (2) activate the software code (operation 228).

Figure 2D:
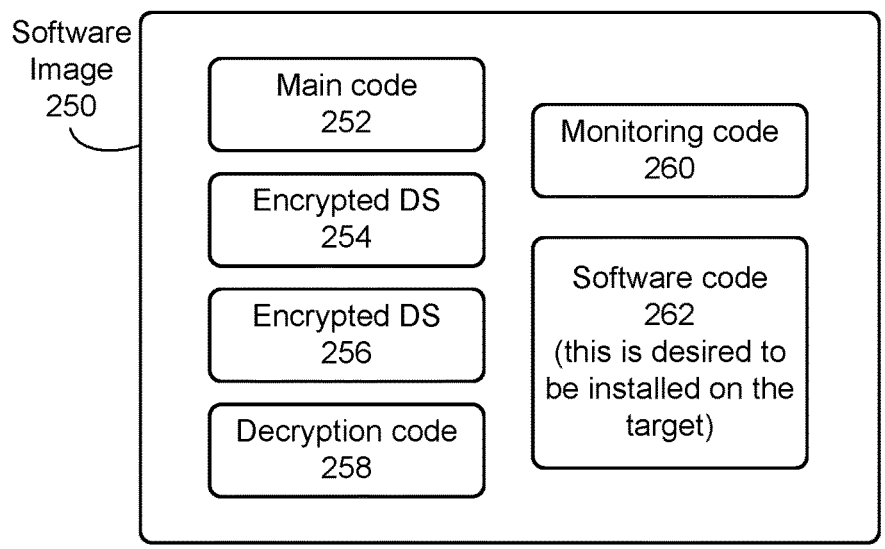
FIG. 2D illustrates components of a software image that can be used to verify the integrity of a target computing platform in accordance with some embodiments described herein.

FIG. 2D illustrates components of a software image that can be used to verify the integrity of a target computing platform in accordance with some embodiments described herein. The components shown in FIG. 2D are for illustrations purposes only, and are not intended to limit the scope of the disclosed embodiments. Specifically, it will be apparent to persons having ordinary skill in the art that a software image can include greater or fewer components that the ones shown in FIG. 2D. Software image 250 can comprise main code 252, encrypted data structures 254 and 256, decryption code 258, monitoring code 260, and software code 262 that is desired to be installed on the target computing platform. When a target computing platform receives software image 252, it can begin by executing main code 252. Main code 252 can include instructions for (1) performing verification of the target computing platform, and upon successful verification, (2) installing software code 262 on the target computing platform. Encrypted data structure 254 can include a first set of execution parameter values that corresponds to executing the software code on a secure instance of the target computing platform. Encrypted data structure 256 can include a second set of execution parameter values that corresponds to decrypting encrypted data structure 254 on the secure instance of the target computing platform. Decryption code 258 can be used to decrypt encrypted data structures 254 and 256. Monitoring code 260 can be used to monitor the execution of software image 250, and to determine execution parameter values associated with the execution of one or more portions of software image 250.

When main code 252 is executed by a target computing platform, main code 252 can execute instructions in decryption code 258 to decrypt encrypted data structure 254. While decryption code 258 is decrypting encrypted data structure 254, monitoring code 260 can determine execution parameter values associated with the execution of decryption code 258 (e.g., decryption code 258 can execute instructions from monitoring code 260 during decryption so that monitoring code 260 can determine execution parameter values during the decryption process). Note that a third set of execution parameter values that corresponds to decrypting the first encrypted data structure on the target computing platform are obtained when decryption code 258 completes decrypting encrypted data structure 254. Next, main code 252 can execute instructions in decryption code 258 to decrypt encrypted data structure 256 to obtain the second set of execution parameter values that corresponds to decrypting encrypted data structure 254 on the secure instance of the target computing platform. Main code 252 can then compare the third set of execution parameter values with the second set of execution parameter values. If the third set of execution parameter values matches (within a given tolerance range) with the second set of execution parameter values, then main code 252 can conclude that the target computing platform is intact, and proceed with communicating with the secure computing platform for final verification, and for receiving instructions to activate software code 262 on the target computing platform. If main code 252 receives instructions to activate software code 262 from secure computing platform, then main code 252 can verify the authenticity of the instructions (any known technique for verifying authenticity can be used here). Once authenticated, main code 252 can activate software code 262. For example, main code 252 can hand execution control over to software code 262.

Figure 3:
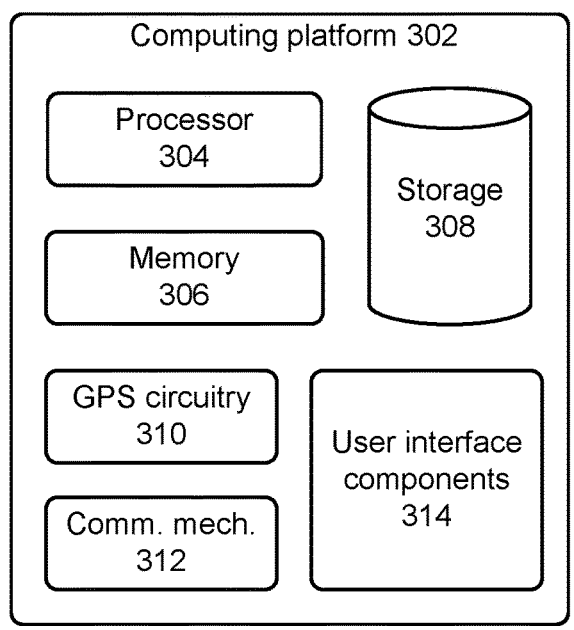
FIG. 3 illustrates a computing platform in accordance with some embodiments described herein.

FIG. 3 illustrates a computing platform in accordance with some embodiments described herein. Computing platform 302 comprises processor 304, memory 306 (e.g., a volatile random access memory, non-volatile random access memory, etc.), and storage 308 (e.g., flash memory, disk drive, etc.). Storage 308 can generally store code (BIOS, a hypervisor, an OS, software applications) and/or data. Computing platform 302 can also include GPS circuitry 310 to receive GPS signals and to determine a geographic location of computing platform 302 based on the received GPS signals. User interface components 314 can generally include any hardware or software components (e.g., keyboard, mouse, display, touchscreen, window manager, etc.) that are used for interacting with a user. Communication mechanism 312 can generally include any hardware or software components (e.g., networking circuitry and ports, serial communication circuitry and ports, networking software, wireless communication circuitry, etc.) that can be used by computing platform 302 to communicate with other devices. The components in computing platform 302 can communicate with one another by using a bus, a backplane, a switching fabric, and/or any other communication circuitry. The number and type of components shown in FIG. 3 are for illustration purposes only and are not intended to limit the scope of the embodiments disclosed herein.

When computing platform 302 corresponds to a secure computing platform, a software application stored in storage 308 can be executed by processor 304. This software application can then generate a software image that can be used to verify the integrity of a target computing platform. Once generated, the software image can be sent to the target computing platform via communication mechanism 312.

When computing platform 302 corresponds to a target computing platform, a software image can be received from a secure computing platform via communication mechanism 312. Next, the software image (which is now stored either in memory 306 and/or storage 308) can be executed by processor 304. The executing software image can then determine the integrity of computing platform 302.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to verify the integrity of a target instance of a computing platform, the method comprising:
    receiving a software image at the target instance of the computing platform; and
    executing the software image at the target instance of the computing platform, thereby causing the target instance of the computing platform to verify the integrity of the target instance of the computing platform by performing a set of operations, comprising:
        measuring a first set of execution parameter values during an execution of a portion of the software image at the target instance of the computing platform, wherein the first set of execution parameter values represents a first sequence of execution states that the target instance of the computing platform passes through while executing the portion of the software image; and
        comparing the first set of execution parameter values with a second set of execution parameter values associated with executing the portion of the software image at a secure instance of the computing platform, wherein the second set of execution parameter values represents a second sequence of execution states that the secure instance of the computing platform is expected to pass through while executing the portion of the software image.

2. The method of claim 1, wherein the set of operations further comprises:
    determining a verification message based on said comparing the first set of execution parameter values with the second set of execution parameter values; and
    sending the verification message to a secure computing platform.

3. The method of claim 2, wherein the set of operations further comprises:
    receiving instructions from the secure computing platform in response to the verification message; and
    performing an action at the target instance of the computing platform based on the received instructions.

4. The method of claim 3, wherein the action is resetting the target computing platform to a secure state.

5. The method of claim 3, wherein the action is activating software code that was embedded in the software image.

6. The method of claim 1, wherein at least one execution parameter is one of: total cycles, absolute starting time, absolute ending time, Global Positioning System (GPS) parameters, or a number of instructions that were executed.

7. A non-transitory computer-readable storage medium storing a software image that, when executed by a target instance of a computing platform, causes the target instance of the computing platform to perform a method to verify the integrity of the target instance of the computing platform, the method comprising:
    measuring a first set of execution parameter values during an execution of a portion of the software image at the target instance of the computing platform, wherein the first set of execution parameter values represents a first sequence of execution states that the target instance of the computing platform passes through while executing the portion of the software image; and
    comparing the first set of execution parameter values with a second set of execution parameter values associated with executing the portion of the software image at a secure instance of the computing platform, wherein the second set of execution parameter values represents a second sequence of execution states that the secure instance of the computing platform is expected to pass through while executing the portion of the software image.

8. The non-transitory computer-readable storage medium of claim 7, wherein the method further comprises:
    determining a verification message based on said comparing the first set of execution parameter values with the second set of execution parameter values; and
    sending the verification message to a secure computing platform.

9. The non-transitory computer-readable storage medium of claim 8, wherein the method further comprises:
    receiving instructions from the secure computing platform in response to the verification message; and
    performing an action at the target instance of the computing platform based on the received instructions.

10. The non-transitory computer-readable storage medium of claim 9, wherein the action is resetting the target computing platform to a secure state.

11. The non-transitory computer-readable storage medium of claim 9, wherein the action is activating software code that was embedded in the software image.

12. The non-transitory computer-readable storage medium of claim 7, wherein at least one execution parameter is one of: total cycles, absolute starting time, absolute ending time, Global Positioning System (GPS) parameters, or a number of instructions that were executed.

13. A target instance of a computing platform, comprising:
    a processor; and
    a non-transitory computer-readable storage medium storing a software image that, when executed by the processor, causes the target instance of the computing platform to perform a method to verify the integrity of the target instance of the computing platform, the method comprising:

measuring a first set of execution parameter values during an execution of a portion of the software image at the target instance of the computing platform, wherein the first set of execution parameter values represents a first sequence of execution states that the target instance of the computing platform passes through while executing the portion of the software image; and comparing the first set of execution parameter values with a second set of execution parameter values associated with executing the portion of the software image at a secure instance of the computing platform, wherein the second set of execution parameter values represents a second sequence of execution states that the secure instance of the computing platform is expected to pass through while executing the portion of the software image.

14. The target instance of a computing platform of claim 13, wherein the method further comprises:

determining a verification message based on said comparing the first set of execution parameter values with the second set of execution parameter values; and sending the verification message to a secure computing platform.

15. The target instance of a computing platform of claim 14, wherein the method further comprises:

receiving instructions from the secure computing platform in response to the verification message; and performing an action at the target instance of the computing platform based on the received instructions.

16. The target instance of a computing platform of claim 15, wherein the action is resetting the target computing platform to a secure state.

17. The target instance of a computing platform of claim 15, wherein the action is activating software code that was embedded in the software image.

18. The target instance of a computing platform of claim 13, wherein at least one execution parameter is one of: total cycles, absolute starting time, absolute ending time, Global Positioning System (GPS) parameters, or a number of instructions that were executed.

* * * * *